(12) United States Patent
Rosenberg et al.

(10) Patent No.: US 10,795,103 B2
(45) Date of Patent: Oct. 6, 2020

(54) OPTOELECTRONIC DEVICE WITH A SUPPORT MEMBER

(71) Applicant: Hewlett Packard Enterprise Development LP, Houston, TX (US)

(72) Inventors: Paul Kessler Rosenberg, Sunnyvale, CA (US); Sagi Mathai, Sunnyvale, CA (US); Michael Renne Ty Tan, Menlo Park, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/175,652

(22) Filed: Oct. 30, 2018

(65) Prior Publication Data

US 2020/0132953 A1 Apr. 30, 2020

(51) Int. Cl.
 *G02B 6/42* (2006.01)
 *G02B 6/38* (2006.01)
 *G02B 6/44* (2006.01)

(52) U.S. Cl.
 CPC ............ *G02B 6/428* (2013.01); *G02B 6/422* (2013.01); *G02B 6/4249* (2013.01); *G02B 6/4269* (2013.01); *G02B 6/38* (2013.01); *G02B 6/4224* (2013.01); *G02B 6/4402* (2013.01); *G02B 6/4433* (2013.01)

(58) Field of Classification Search
 None
 See application file for complete search history.

(56) References Cited

U.S. PATENT DOCUMENTS 7,260,328 B2* 8/2007 Kropp ................ G02B 6/29367
 385/47
9,798,087 B1* 10/2017 Mathai ............... G02B 6/29367
9,995,880 B1* 6/2018 Ding .................. G02B 6/29367
2013/0182996 A1 7/2013 Shastri et al.
2013/0183008 A1 7/2013 Shastri et al.
2015/0338585 A1 11/2015 Li et al.
2018/0226735 A1 8/2018 Leigh et al.

FOREIGN PATENT DOCUMENTS

| CN | 1375717 | 10/2002 |
|---|---|---|
| CN | 1216306 C | 8/2005 |
| CN | 105629411 | 6/2016 |
| EP | 0968447 | 11/2001 |
| WO | WO-2018089286 | 5/2018 |

OTHER PUBLICATIONS

Chipscalereview.com; "Chip Scale Review"; Jan.-Feb. 2017; vol. 21, No. 1; 76 pages.
Extended European Search Report received for EP Patent Application No. 19198971.4, dated Mar. 13, 2020, 11 pages.

* cited by examiner

*Primary Examiner* — Jerry Rahll
(74) *Attorney, Agent, or Firm* — Hewlett Packard Enterprise Patent Department

(57) ABSTRACT

Optoelectronic devices with a support member and methods of manufacturing or assembling the same are provided. An example of an optoelectronic device according to the present disclosure includes a substrate and an optical component and an electronic component disposed thereon or therein. The optoelectronic device further includes a ferrule coupled to the optical fiber and an optical socket receiving the ferrule therein. The optoelectronic device includes a support member disposed between the substrate and the optical socket such that the optical socket is spaced from the substrate by the support member.

13 Claims, 6 Drawing Sheets

OPTOELECTRONIC DEVICE WITH A SUPPORT MEMBER

STATEMENT OF GOVERNMENT RIGHTS

This invention was made with Government support under Prime Contract No. DE-AC52-07NA27344 awarded by the DOE. The Government has certain rights in this invention.

BACKGROUND

Optoelectronic communication (e.g., using optical signals to transmit electronic data) is becoming more prevalent as a potential solution, at least in part, to the ever increasing demand for high bandwidth, high quality, and low power consumption data transfer in applications such as high performance computing systems, large capacity data storage servers, and network devices. Optoelectronic systems or devices such as photonic integrated circuits (PICs) having a plurality of electronic and optical components may be used to convert, transmit, or process the optical signals or electronic data. Optical signals may be carried, transmitted, or propagated from board to board, chip to chip, system to system, server to server, or device to device via various transmission media including one or more optical connectors.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1A:
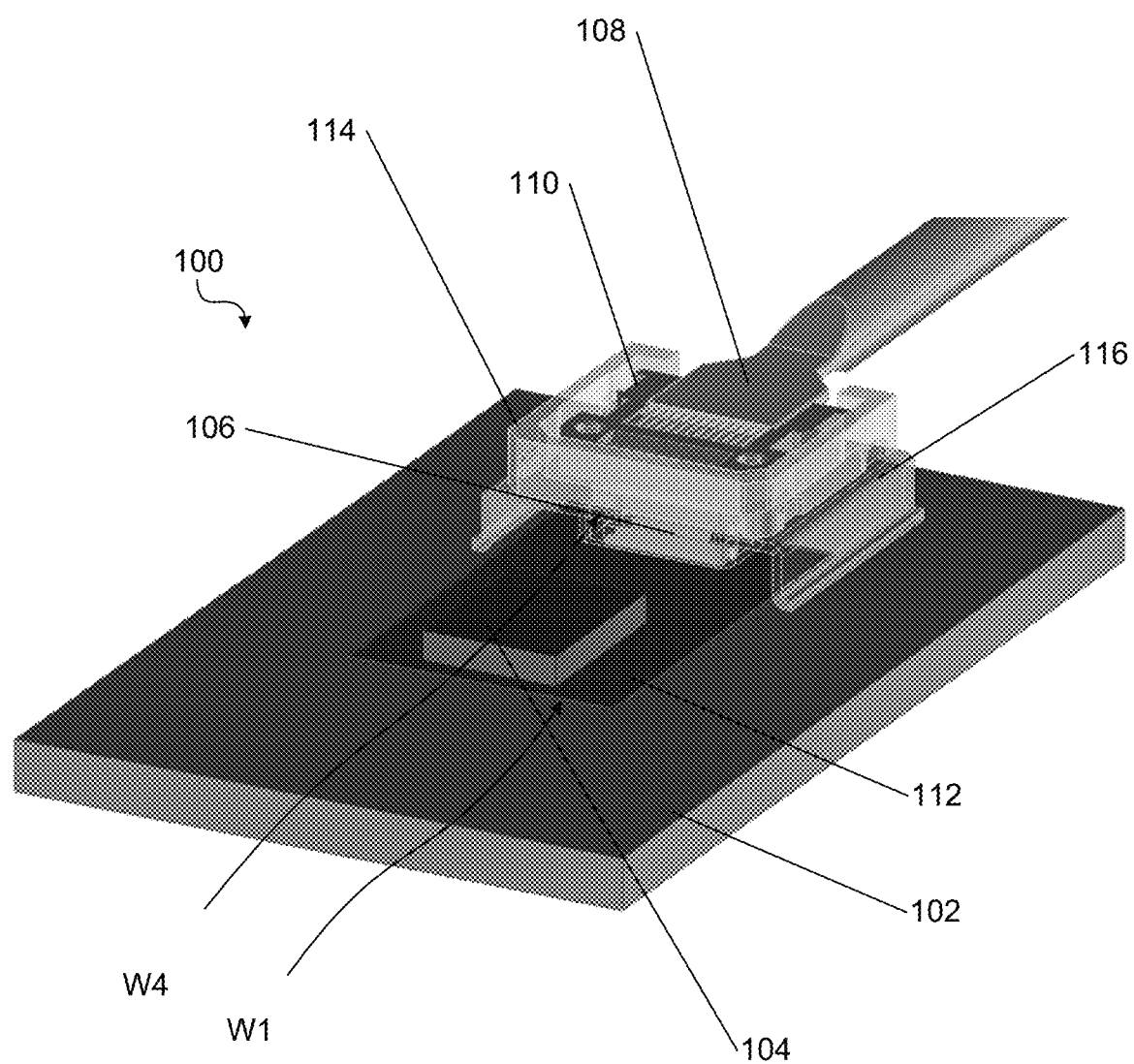
FIG. 1A illustrates an example of an optoelectronic device according to the present disclosure.

Generally, an optoelectronic system or device includes one or more optical connectors to carry, transmit, or propagate optical signals onto or off of the optoelectronic device (e.g., chip, substrate, package, die). The optical connectors may require precisely molded parts or components to provide proper alignment (e.g., micron-level alignment or tolerance) between certain components of the optoelectronic device (e.g., an optical component and an optical ferrule). Because of the high degree of alignment that may be necessary between the components, some parts or assemblies that comprise the optical connector are often difficult to manufacture, and are therefore expensive.

An example of such a precise part is an optical socket configured to align or optically couple to an optical ferrule, into which are assembled one or more optical fibers, which, in turn, are aligned with respect to an optical component (e.g., disposed on an optoelectronic substrate of an optoelectronic device). The optical socket will typically be precisely aligned and subsequently bonded to an optoelectronic substrate that may include or comprise one or more of an electronic printed circuit board (PCB) or other suitable circuit board (e.g., silicon, organic material), a substrate layer disposed over the circuit board, a silicon interposer, or a combination of an interposer bonded on top of a circuit board or substrate layer. More complex structures, consisting of multiple stacked layers of organic substrates and Si interposers, are also possible. Depending on the system geometry and the method of attachment, an optical socket may be bonded to the substrate (e.g., substrate layer or the circuit board) or to an interposer mounted on top of the substrate. Interposers may come in a variety of sizes, having widths or lengths that may vary from a few mm up to 20 mm or larger. If an optical socket is configured to be bonded or otherwise mounted to the substrate, it may be necessary for the optical socket to straddle the interposer bonded on top of the substrate or circuit board. In this case, a variety of optical socket sizes may be needed to correspond to the variety of interposer sizes available.

As mentioned earlier, the optical socket generally contains alignment features of extremely high precision. These may be positive or male alignment features such as guide pins (e.g., with diameter tolerance in the range of +/−1 um, and spacing between pairs of guide pins controlled to less than 5 um). Alignment features in the socket may also be of negative or female form, such as guide holes or slots. When an optical socket incorporates positive alignment features, a ferrule which is mated to it incorporates corresponding negative features. In some implementations, optical sockets with negative alignment features are mated to ferrules with corresponding positive features.

Optical sockets will typically be manufactured by a process of plastic injection molding or metal forming such as fine blanking or stamping. These processes are used very broadly in the manufacture of electronic components, and are generally among the least expensive manufacturing processes available. However, molding and stamping, for example, are typically not used to produce parts with tolerances in the range of +/−1 um to +/−5 um. Producing such precise parts, as are required for efficient optical data transmission, may require the use of very expensive molding equipment and specialized molding compounds. Metal molds, into which the plastic comprising an optical socket is injected, may contain only 1 or 2 cavities, each of which produces a single part during a molding production cycle. This contrasts to a more standard injection mold which may contain 64 or 128 cavities, thereby increasing production by a factor of 100 times or more per cycle in comparison. Finally the actual molding process must often be done more slowly than usual, to minimize thermal distortion of the resulting optical socket. The process of perfecting such high precision parts is extremely time consuming. Each newly designed component behaves differently than its predecessor, and requires a great deal of expert technical attention to be brought into compliance with specification. Clearly, this combination of factors causes a significant relative increase in the cost of super-high precision molded parts as compared to standard tolerance parts.

Within these constraints, it is highly desirable to make as few types of high precision parts as practicable and to use existing qualified parts in as many applications as possible. According to the present disclosure, one way to achieve this result is to separate the optical socket into two parts as described herein—a high precision optical socket (e.g., optical socket 114) and a much lower precision support or base member (e.g., support member 116). In this manner, the generally more expensive, high precision optical socket can be used regardless of system geometry, by assembling it in combination with the generally less expensive support member. The support member may be made with various sizes as described herein.

Besides the benefit of reusing the high precision optical socket, there are additional benefits to bonding the support member to the circuit board or other portion of the substrate as opposed to the interposer mounted on the substrate as described herein in accordance with implementations of the present disclosure. This approach removes the optical socket from the surface of the interposer and transfers the attachment strength to the circuit board or substrate underlying the interposer. The presence of the optical socket on top of or directly attached to the interposer may produce undesirable results due to mechanical stress or induced electrical effects. Additionally, the mechanical bond strength between the optical socket and the substrate may be increased by utilizing additional area on the substrate or circuit board for attachment to the support member that is not available on the interposer. This may be especially important when mechanical forces are applied to an optical cable that exits the ferrule or optical socket which may impact the bond as commonly occurs in this context. The support member may even be solder reflow attached to the substrate or circuit board, providing an extremely robust mechanical attachment.

However, it should also be noted that there are implementations as described herein wherein the support member is bonded directly to an interposer mounted on the circuit board or substrate. This may be done in order to meet geometry requirements (e.g., save space), make use of existing parts, or for other reasons. In this case, it will still be beneficial to utilize a single-sized optical socket in combination with less expensive support members (e.g., that may be manufactured in multiple sizes) due to an expected geometric variation in the geometry of the available interposers.

Implementations of the present disclosure provide improved optoelectronic devices or methods of manufacturing or assembling the same to provide a precise or high degree of alignment between certain components while efficiently using overall system volume, reducing manufacturing complexity, or reducing manufacturing costs. For example, inexpensive support members of different sizes may be manufactured or constructed to fit various-sized interposers or substrates. One or single-sized optical sockets couplable to such support members may be used to provide the necessary high-precision alignment between the optical ferrule and optical component resident or otherwise disposed on the interposer or circuit board. The inexpensive support member configured to fit a specific-sized interposer or substrate may be assembled to the single-sized optical socket to mount the optical socket to the substrate or interposer accordingly.

Figure 1B:
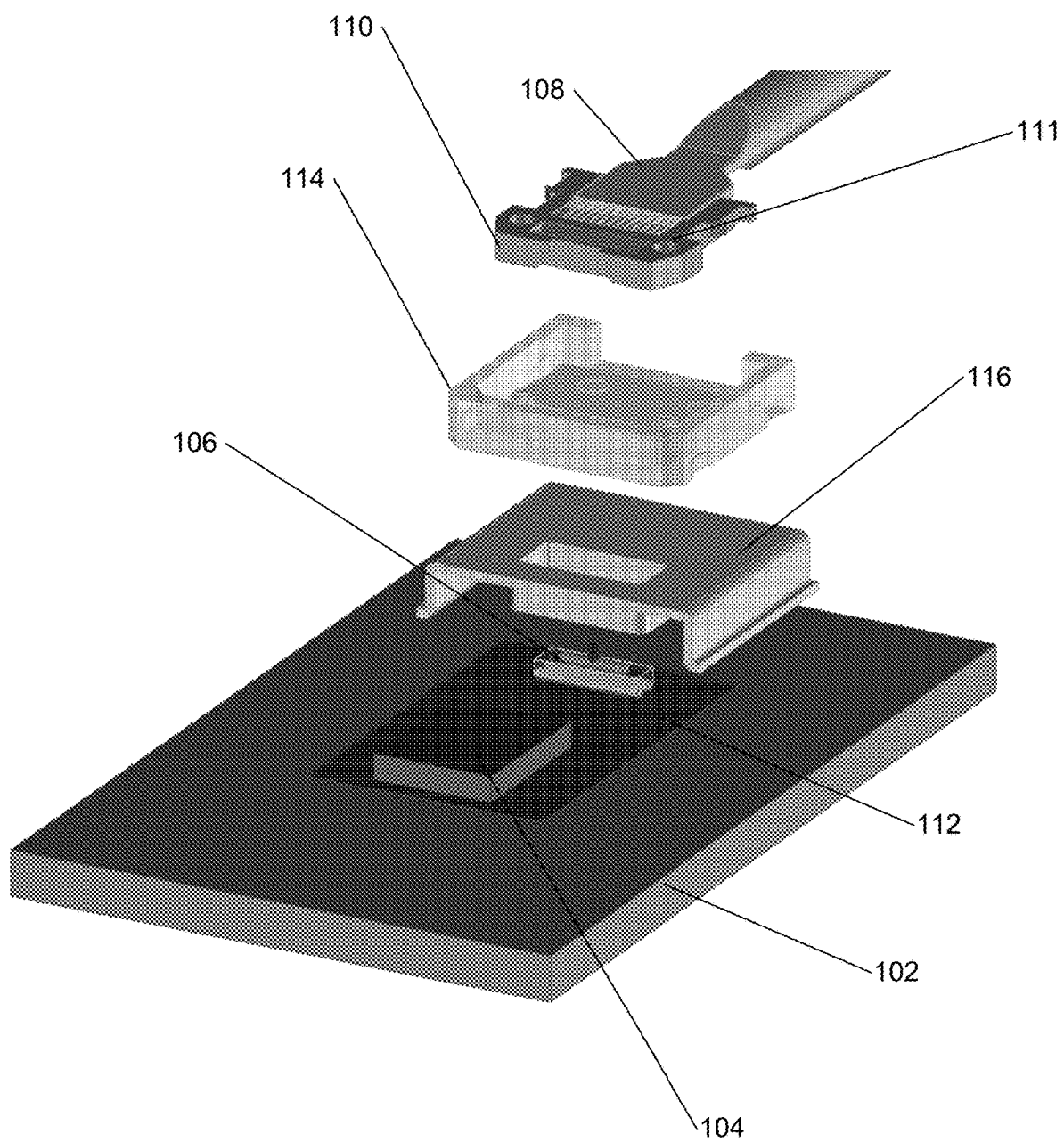
FIG. 1B illustrates an exploded view of the optoelectronic device of FIG. 1A.

FIGS. 1A-1B illustrate an example of an optoelectronic system or device 100 according to the present disclosure. The optoelectronic device 100 includes a substrate 102 (e.g., an organic substrate layer). The substrate 102 may include a substrate layer disposed over a circuit board. The substrate 102 may serve as a foundation or common carrier for electronic and optical components mounted or otherwise disposed on an interposer 112 (e.g., an optical or electro-optical interposer). For example, one or more electronic components 104 and one or more optical components 106, such as a lens array, may be disposed on or within the interposer 112. The optoelectronic device 100 may incorporate elements such as waveguides, grating couplers, electro-optical modulators, photodetectors, or other electro-optical components used to convert an electrical signal to a light signal or vice versa. While not specifically illustrated in FIGS. 1A-1B, the interposer 112 may include multiple layers (e.g., conducting, semiconductor, dielectric, or insulating layers). The interposer 112 may include an insulating layer sandwiched between semiconductor layers. For example, the interposer 112 may be a silicon-on-insulator (SOI) or a silicon-on-glass substrate. In some implementations, the interposer 112 includes an insulating layer such as a buried oxide (BOX) layer composed of silicon dioxide or other insulating oxide material. In other implementations, the insulating layer is composed of another insulating material such as sapphire, diamond, or glass.

The one or more electronic components 104 are in electrical communication with electro-optical components (e.g., incorporated in or on an interposer 112 or the substrate 102 as described in more detail below), which in the transmission mode, transform electrical signals into optical signals which are transmitted through a lens array 106 into a ferrule (e.g., ferrule 110). When operating in a receive mode, optical signals are transmitted from the ferrule, on an optical socket (e.g., optical socket 114), into the lens array where the signals are focused onto electro-optical components embedded in the interposer beneath the lens array, converted into electronic signals, and ultimately transferred to the electronic component 104 for processing. The optoelectronic device 100 may include the interposer 112 to connect (e.g., optically or both electrically and optically) the one or more electronic and optical components as described in more detail below with respect to FIGS. 4A-4B. The one or more electronic components 104 may include, but are not limited to, integrated circuits, processors, chip sets, circuit boards, or combinations thereof. The one or more optical components 106 may include, for example, single lenses, lens arrays, fiber stubs, or optical tapers. Electro-optical components integrated into the interposer 112 or substrate 102 may include but are not limited to, light emitters, light detectors, photodetectors, wave guides, modulators, heaters, filters, and combinations thereof. For example, the optical component 106 may be a lens or lens array configured to collect, collimate, focus, or concentrate optical signals prior to passing the optical signals from the light emitter, to the light detector, or to/from the optical transceiver or an optical fiber optically coupled to the lens or lens array. Vertical cavity surface emitting lasers, light emitting diodes, distributed feedback semiconductor laser diodes, or miniature lasers are examples of commonly used light emitters or sources. Surface illuminated photodiodes, waveguide photodetectors, or phototransistors are examples of commonly used light detectors.

The optoelectronic device 100 further includes an optical fiber 108 and a ferrule 110 coupled (e.g., opto-mechanically) to the optical fiber 108. A first end of the optical fiber 108 may terminate within or otherwise be coupled or bonded to the ferrule 110. In some implementations, a second end of the optical fiber 108 may be coupled to a light emitter, light detector, or optical transceiver (not shown in FIG. 1A-1B) disposed off of or away from the substrate 102. The optical fiber 108 may carry or transmit optical signals to or from the optical component 106 (e.g., onto or off of the optoelectronic device 100). The optical fiber 108 may be a single fiber or an array of fibers. The optical fiber 108 may be a single mode, polarization maintaining, or multi-mode optical fiber.

The optoelectronic device 100 further includes an optical socket 114 configured (e.g., shaped or dimensioned) to receive and hold the ferrule 110 therein. The optical socket 114 aligns the ferrule 110 and the optical component 106 when the ferrule 110 is received (e.g., positioned, disposed, inserted) therein and the optical socket 114 is mounted on or to the substrate 102 via a support member 116 as described in more detail below. For example, the optical fiber 108 coupled to the ferrule 110 may be aligned with a lens of the optical component 106 such that optical signals may be transferred or transmitted from the optical component 106 to the optical fiber 108 or vice versa when the ferrule 110 is received within the optical socket 114 and the optical socket 114 is mounted on or to the substrate 102 via a support member 116.

Figure 2A:
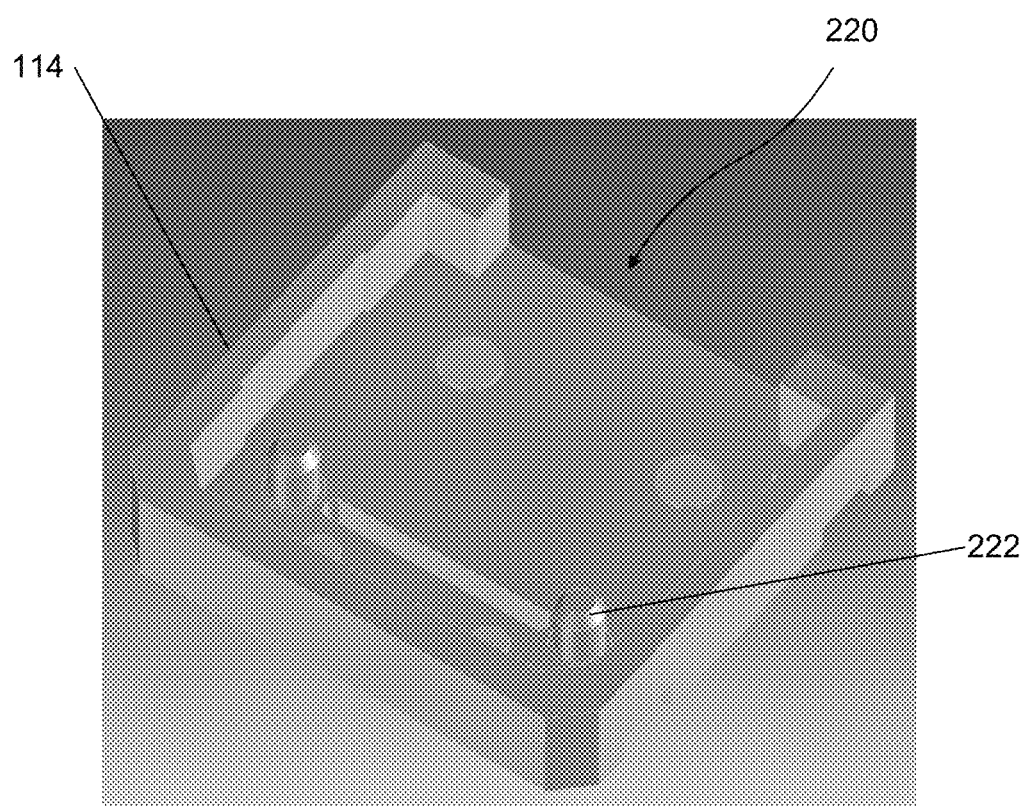
FIG. 2A illustrates a close-up, top perspective view of the optical socket of FIG. 1A.
Figure 2B:
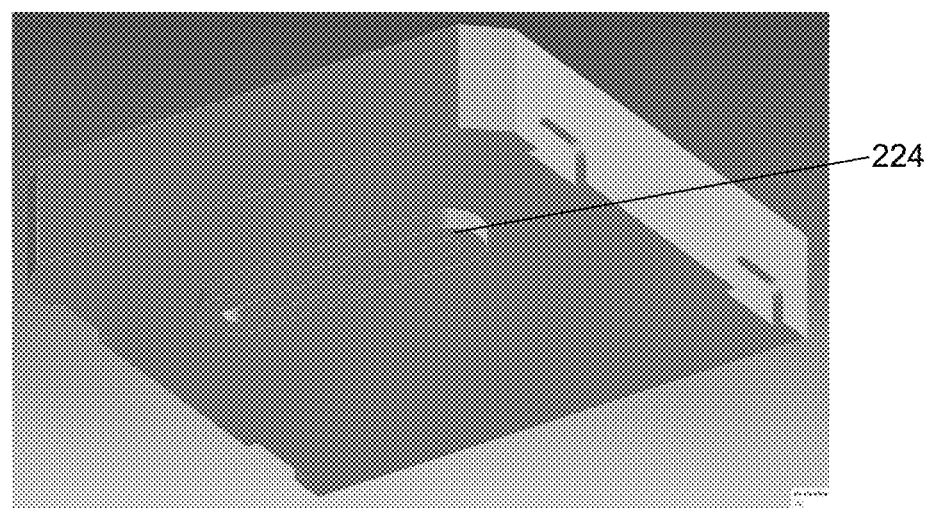
FIG. 2B illustrates a close-up, bottom perspective view of the optical socket of FIG. 1A.

With reference to close-up views of the optical socket 114 in FIGS. 2A-2B, to provide the precise alignment between the ferrule 110 and the optical component 106 as described above, the optical socket 114 is a precisely molded or manufactured part or component with critical alignment features fabricated with micron tolerances (e.g., of less than +/−5 um, and in some cases +/−1 um). For example, the optical socket 114 may include a receptacle 220 shaped, sized, or dimensioned to receive the ferrule 110. In particular, the receptacle 220 may have a shape or contour configured to match or mate with a corresponding shape or contour of a body of the ferrule 110.

In some implementations, the optical socket 114 may include one or more alignment features 222 (e.g., mechanical attachment features) configured to mate with corresponding alignment features 111 of the ferrule 110 to align the ferrule 110 thereto. For example, the optical socket 114 may include one or more male connector features configured to mate with corresponding female connector features of the ferrule 110 or vice versa. Male connector features may include pins, poles, or protrusions and female connector features may include holes, openings, or cavities. In some implementations, the optical socket 114 may include one or more alignment or connector features 224 configured to mate with corresponding alignment or connector features (e.g., opening or slot 344) of the support member 116 as described in more detail below.

Referring back to FIGS. 1A-1B, the optoelectronic device 100 further includes the support member 116. As described above, the optical socket 114 is fixedly mounted on or to the substrate 102 via the support member 116. The support member 116 is disposed between the substrate 102 and the optical socket 114 such that the optical socket 114 is spaced from the substrate 102 by the support member 116. The support member 116 may be bonded (e.g., fixedly attached, assembled on, or otherwise physically coupled) to both the substrate 102 (e.g., or interposer 112) and the optical socket 114 to support the optical socket 114 on the substrate 102 in a fixed position. The support member 116 may provide a base for the optical socket 114 to sit or be disposed on between the optical socket 114 and the substrate 102.

In some implementations, the support member 116 is soldered to the substrate 102 or adhered to the substrate 102 with an adhesive (e.g., curable adhesive or epoxy). The support member 116 may be constructed out of a material able to withstand multiple solder reflow temperature cycles (e.g., up to 270 degrees C.) for a limited period of time (e.g., typically less than 1 minute). In some implementations, the support member 116 is adhered to the optical socket 114 with an adhesive (e.g., curable adhesive or epoxy). In other implementations, the support member 116 is bonded to the optical socket 114 using solder or by localized melting of the socket by means of a laser or other focused heating method.

In some implementations, the support member 116 may provide strain relief between the optical socket 114 and the substrate 102 or interposer 112 as the optical socket 114 is not directly coupled or bonded to either the substrate 102 or interposer 112. In other implementations, the support member 116 may be constructed out of a material (e.g., metallic material) and act as an electromagnetic shield or radio frequency shield for the optical or electronic components it covers or is disposed over. In some implementations, the optical socket 114 is removable or detachable from the support member 116 without damaging one or more of the optical interposer 112, substrate 102, or optical component 106 after the optical socket 114 is bonded or otherwise attached to the support member 116. As such, the optical socket 114 may be removed from the optoelectronic device to provide modularity (e.g., for repair, inspection, or replacement).

The support member 116 is a relatively inexpensive part or component to manufacture. For example, in some implementations, the support member 116 is constructed out of sheet metal or plastic. The support member 116 may be formed or constructed without being precisely molded or manufactured. That is, the support member 116 may be constructed without micron-level tolerance alignment features to align the ferrule 110 and the optical component 106 in contrast with the optical socket 114. In this manner, manufacturing costs, time, and complexity for the support member 116 may be greatly reduced relative to that of the optical socket 114. Additionally, multiple or various sized or dimensioned support members 116 configured to fit over or straddle substrates 102 or interposers 112 with different sizes may be made without heavily impacting manufacturing costs. As described in more detail below, single or one sized optical sockets 114 may be bonded to support members 116 of different or various sizes to mount the optical sockets 114 to substrates or interposers having different dimensions.

Figure 4A:
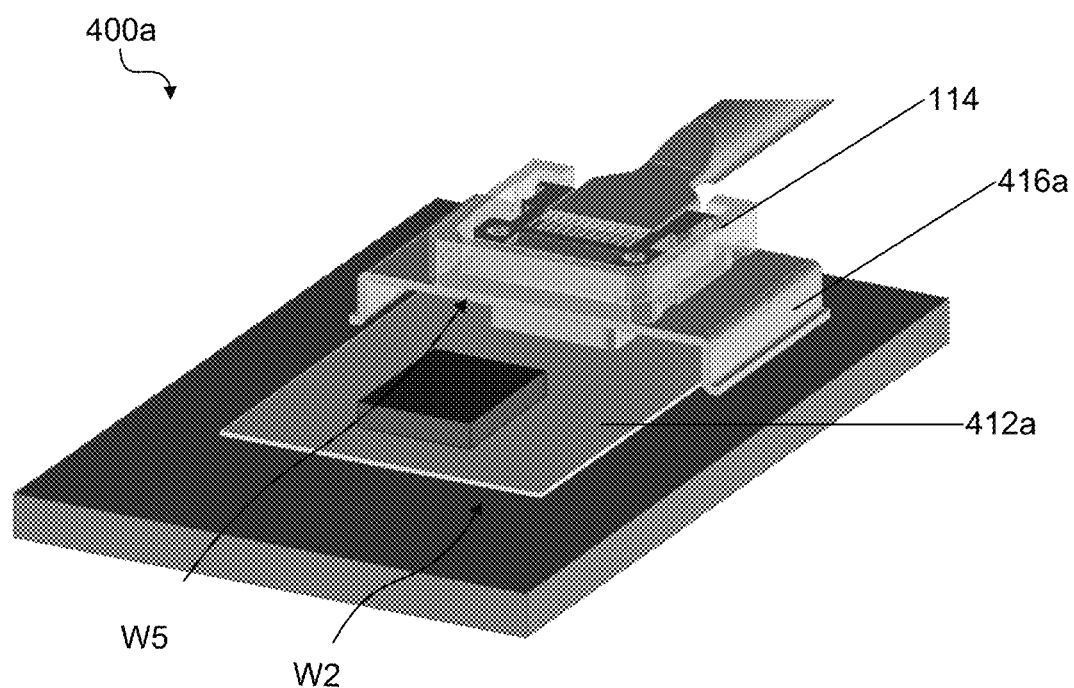
FIG. 4A illustrates another example of an optoelectronic device according to the present disclosure.
Figure 4B:
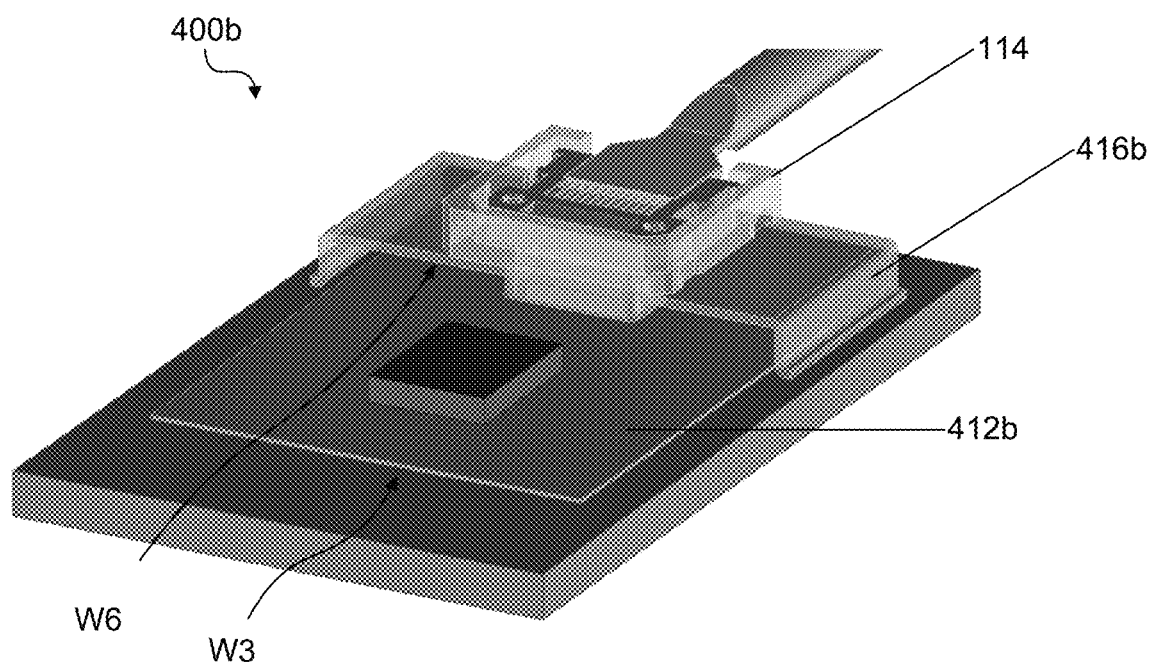
FIG. 4B illustrates yet another example of an optoelectronic device according to the present disclosure.

With reference to FIGS. 1A and 4A-4B together, the optical socket 114 is bondable to support members 116, 416a, and 416b having different dimensions. The support members 416a and 416b may include one or more of any of the features of support member 116 described herein. Respective interposers 112, 412a, and 412b of optoelectronic devices 100, 400a, and 400b may have different widths W1, W2, and W3, respectively, wherein W1<W2<W3. The respective support members 116, 416a, and 416b may have corresponding different widths W4, W5, and W6, respectively, to fit over (e.g., straddle) the respective interposers 112, 412a, and 412b wherein W4<W5<W6. In this manner, a single-sized optical socket 114 may be used with various sized support members to be mounted to substrates or interposers of different sizes. A single SKU may be provided for the relatively more costly to manufacture optical socket 114 while multiple SKU's can be provided for different sized support members (e.g., support members 116, 416a, 416b) that are relatively inexpensive to manufacture. While referring to different widths, the respective interposers and support members may have different corresponding lengths or heights in addition to or instead of widths.

Figure 3A:
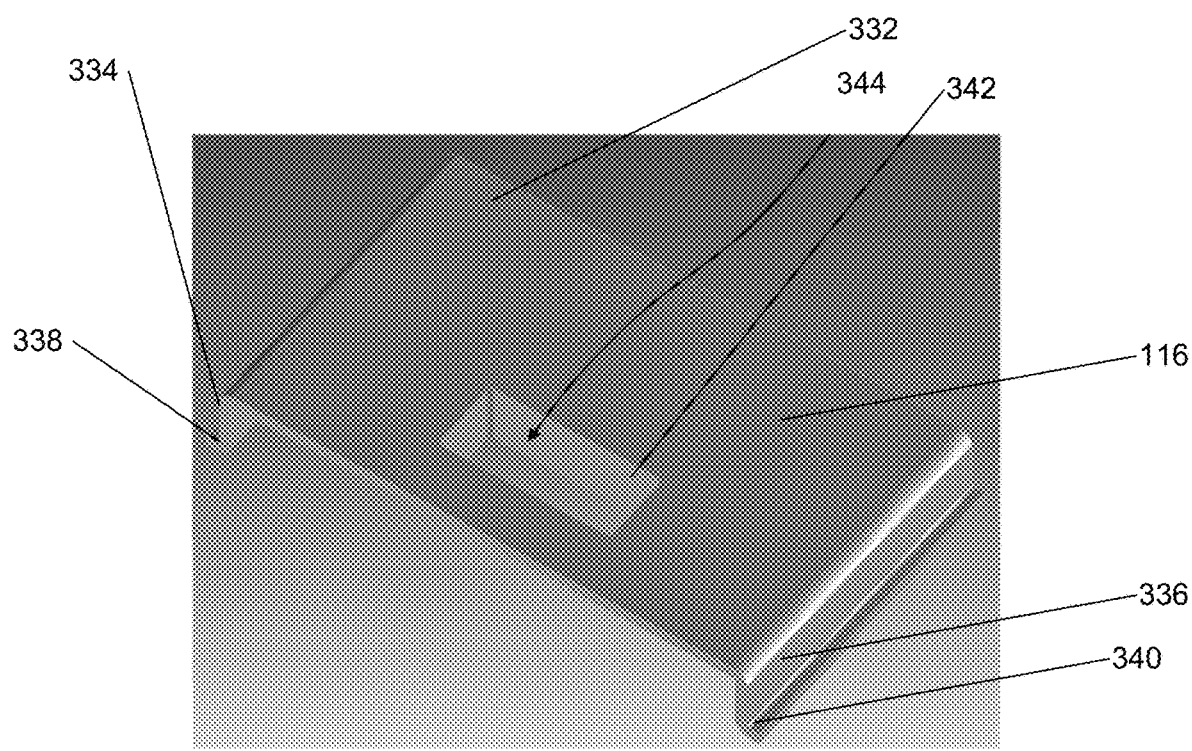
FIG. 3A illustrates a close-up, top perspective view of the support member of FIG. 1A.
Figure 3B:
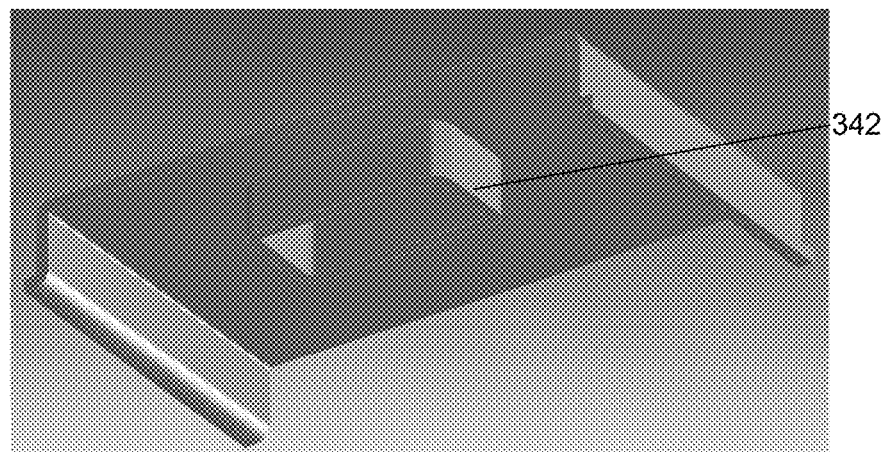
FIG. 3B illustrates a close-up, bottom perspective view of the support member of FIG. 1A.

With reference to close-up views of the support member 116 illustrated in FIGS. 3A-3B, in some implementations, the support member 116 may have a substantially U-shaped configuration. However, the support member 116 is not limited to such a configuration. The support member 116 may include a support surface 332 (e.g., planar surface) extending between two opposing sidewalls 334 and 336. The optical socket 114 may be bonded to the support surface 332 while the substrate 102 may be bonded to the two opposing sidewalls 334 and 336. In some implementations, the sidewalls 334 and 336 include stand-off or mounting feet 338 and 340, respectively, to be in direct contact with the substrate 102. The optical socket 114 may also incorporate features, such as cylindrical projections, formed on the lower surface that mate with an upper surface of support member surface 116. In this context, corresponding features, such as round holes or elongated slots, will be formed through upper surface of support member 116 to accommodate the locating features on the optical socket 114. These features may be used to provide coarse alignment between the optical socket 114 and the support member 116 or to increase the attachment strength of the adhesive joint bonding the optical socket to the support member.

In some implementations support member 116 comprises a recessed enclosure 342 extending along two, three, or four sides of the optical component 106 when the support member 116 is bonded to the substrate 102 or interposer 112. This enclosure 342 may act to prevent or reduce the entry of contamination or debris into the optical path between the ferrule 110, optical component 106 (e.g., a lens array), and electro-optical components fabricated on the surface of the interposer 112. Effectiveness of enclosure 342 as a contamination shield may be enhanced by dispensing a bead of adhesive between a top or upper surface of the interposer 112 and an opposing surface of the enclosure 342. When the adhesive is cured, it may effectively close off any gap that may exist between the interposer 112 and support member 116, and prevents the entry of all contamination from below the optical socket 114. A through opening 344 of the recessed enclosure 342 allows optical signals to pass therethrough between the optical component 106 and the optical fiber 108 coupled to the ferrule 110. Further, in some implementations, the through opening 344 may function as the connector feature configured to mate with the connector feature 224 of the optical socket 114. For example, the opening 344 may be a slot configured to receive the connector feature 224 therein.

Figure 5:
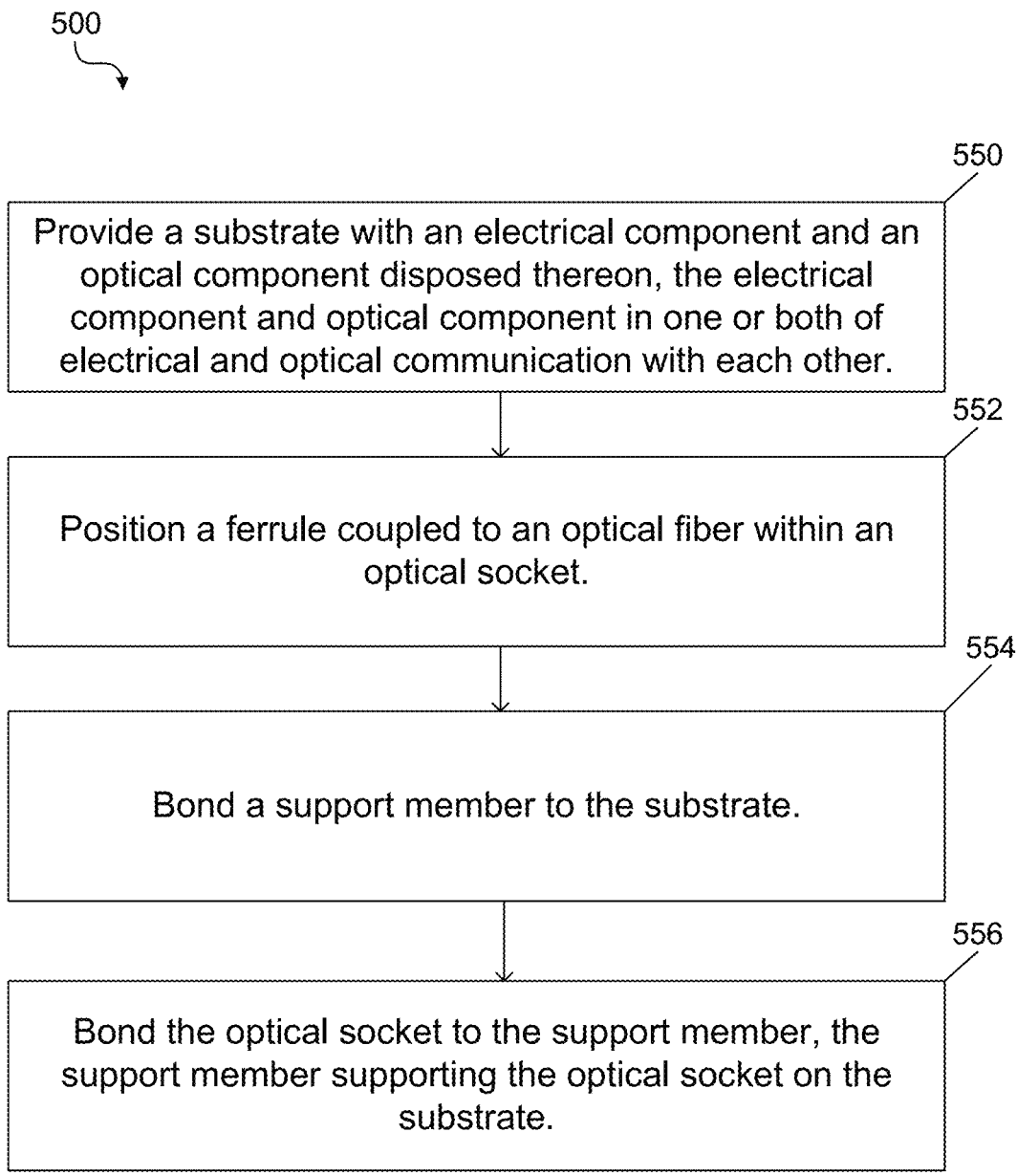
FIG. 5 is a flowchart schematically illustrating an example method of manufacturing or assembling an optoelectronic device according to the present disclosure.

FIG. 5 illustrates a flowchart of an example method of manufacturing or assembling an optoelectronic device (e.g., optoelectronic devices 100, 400a, 400b) according to the present disclosure. The method 500 begins at block 550, wherein the substrate 102 with an electrical component 104 and an optical component 106 disposed thereon is provided. The electrical component 104 and optical component 106 are configured to be in electrical communication, optical communication, or both optical and electrical communication with each other. At block 552, the ferrule 110 coupled to the optical fiber 108 is positioned within the optical socket 114. At block 554, the support member 116 is bonded to the substrate 102. At block 556, the optical socket is bonded to the support member 116. The support member 116 supports the optical socket 114 on the substrate 102. In some implementations, the support member 116 is bonded to the substrate 102 prior to bonding the optical socket 114 to the support member 116. In other implementations, the optical socket 114 is bonded to the support member 116 prior to bonding the support member 116 to the substrate 102. In some implementations, the method provides alignment between optical transmitting and receiving components of the optoelectronic device as described herein.

In some implementations, the support member 116 is bonded directly to the substrate 102 or circuit board underlying the substrate 102 as described herein. In other implementations, the support member 116 is bonded directly to the interposer 112 disposed on the substrate 102. In yet other implementations, the support member 116 is bonded to the substrate 102 and straddles or is cantilevered with respect to the interposer 112. In some implementations, the method 500 may include removing or detaching the optical socket 114 from the support member 116 without damaging the substrate 102, optical component 106, or interposer 112 (e.g., to repair, replace, or inspect the optical socket 114 or other components therein).

In some implementations, the method 500 may further include passive alignment of, on the one hand, the ferrule 110 or optical socket 114, and, on the other hand, the optical component 106 or the optical interposer 112, by using pattern recognition or intelligent machine vision to bring into alignment one or more mechanical alignment features (e.g., corresponding features 222, 111, features 344, 224, or receptacle 220) prior to bonding the optical socket 114 to the support member 116, or bonding both socket 114 and support member 116 to the substrate 102, having previously bonded the socket 114 to the support member 116.

In some implementations, the method 500 may further include active alignment of the ferrule 110 or the optical socket 114 and the optical component 106 or the optical interposer 112 prior to bonding the support member 116 to the substrate 102, bonding the optical socket 114 to the support member 116, or both. In such implementations, the method 500 includes activation of an optical light source (e.g., disposed on or off the substrate 100 coupled to the optical component 106 or the optical fiber 108, respectively) to emit light between the optical fiber 108 and the optical component 106. The method 500 further includes moving the optical socket 114 or the optical component 106 to a plurality of positions relative to each other. The components may be moved in a plane at an angle (e.g., orthogonal, parallel, or oblique) relative to a path of the light to adjust the path of the light between the optical fiber 108 and the optical component 106. For example, when the path of the light between the optical fiber 108 and the optical component 106 is perpendicular or orthogonal relative to a top or rear surface of substrate 102, the components may be moved to a plurality of positions in a plane orthogonal to the path of the light (e.g., in a plane parallel to the substrate 102). In some implementations, the components may be moved in a plane extending parallel to the top or rear surface of the substrate 102. The method further includes monitoring light throughput at each of the plurality of positions and bonding the support member 116 to the substrate 102, the optical socket 114 to the support member 116, or both, at the position wherein light throughput is greatest.

In the foregoing description, numerous details are set forth to provide an understanding of the subject disclosed herein. However, implementations may be practiced without some or all of these details. Other implementations may include additions, modifications, or variations from the details discussed above. It is intended that the appended claims cover such modifications and variations. The specification and drawings are, accordingly, to be regarded as illustrative rather than restrictive.

It will be recognized that the terms "comprising," "including," and "having," as used herein, are specifically intended to be read as open-ended terms of art. The term "or," in reference to a list of two or more items, covers all of the following interpretations of the word: any of the items in the list, all of the items in the list, and any combination of the items in the list. As used herein, the terms "connected," "coupled," or any variant thereof means any connection or coupling, either direct or indirect, between two or more elements; the coupling or connection between the elements can be physical (e.g., mechanical), logical, electrical, optical, or a combination thereof.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

The invention claimed is:

1. An optoelectronic device comprising:
   a substrate;
   an optical interposer disposed on the substrate;
   an electronic component disposed on the optical interposer;
   an optical component disposed on or in the optical interposer in one or both of electrical and optical communication with the electronic component;
   an optical fiber,
   a ferrule coupled to the optical fiber;
   an optical socket receiving the ferrule therein, the optical socket to align the ferrule and the optical component when the ferrule is received therein and the optical socket is mounted on the substrate, the optical socket bondable to support members having different dimensions;
   a support member disposed between the substrate and the optical socket such that the optical socket is spaced from the substrate by the support member, the support member bonded to both the substrate and the optical socket to support the optical socket on the substrate, wherein the support member is bonded directly to the interposer.

2. An optoelectronic device comprising:
   a substrate;
   an optical interposer disposed on the substrate;
   an electronic component disposed on the optical interposer;
   an optical component disposed on or in the optical interposer in one or both of electrical and optical communication with the electronic component;
   an optical fiber;
   a ferrule coupled to the optical fiber;
   an optical socket receiving the ferrule therein, the optical socket to align the ferrule and the optical component when the ferrule is received therein and the optical socket is mounted on the substrate, the optical socket bondable to support members having different dimensions;
   a support member disposed between the substrate and the optical socket such that the optical socket is spaced from the substrate by the support member, the support member bonded to both the substrate and the optical socket to support the optical socket on the substrate, wherein the support member is cantilevered over at least a portion of the optical interposer.

3. An optoelectronic device comprising:
   a substrate;
   an optical interposer disposed on the substrate;
   an electronic component disposed on the optical interposer;
   an optical component disposed on or in the optical interposer in one or both of electrical and optical communication with the electronic component;
   an optical fiber;
   a ferrule coupled to the optical fiber;
   an optical socket receiving the ferrule therein, the optical socket to align the ferrule and the optical component when the ferrule is received therein and the optical socket is mounted on the substrate, the optical socket bondable to support members having different dimensions, the optical socket and ferrule including corresponding alignment features to align the ferrule within the optical socket when received therein;
   a support member disposed between the substrate and the optical socket such that the optical socket is spaced from the substrate by the support member, the support member bonded to both the substrate and the optical socket to support the optical socket on the substrate;
   wherein the optical component comprises a lens and wherein the optical socket aligns the ferrule and the lens when the ferrule is received therein and the optical socket is mounted on the substrate.

4. The optoelectronic device of claim 3, wherein the support member is dimensioned to straddle opposing sides of the interposer.

5. The optoelectronic device of claim 3, wherein the support member comprises a recessed enclosure including walls extending along two or more sides of the optical component.

6. The optoelectronic device of claim 5, wherein a through opening of the recessed enclosure allows optical signals to pass therethrough between the optical component and the optical fiber coupled to the ferrule and the walls enclose an optical path between the optical component and the optical fiber to reduce entry of contaminants therein.

7. The optoelectronic device of claim 3, wherein the support member is constructed out of one or more of sheet metal, plastic, or a material able to withstand multiple solder reflow temperature cycles.

8. The optoelectronic device of claim 3, wherein the optical socket is removable from the support member without damaging one or both of the optical interposer and optical component.

9. The optoelectronic device of claim 3, wherein the support member is soldered to the substrate or adhered to the substrate with an adhesive.

10. The optoelectronic device of claim 3, wherein the support member is adhered to the optical socket with an adhesive or bonded to the optical socket by localized melting of a portion of the socket or support member.

11. The optoelectronic device of claim 3, wherein the support member comprises a substantially U-shaped configuration, the support member including a support surface extending between two opposing sidewalls, the optical socket bonded to the support surface and the substrate bonded to the two opposing sidewalls.

12. The optoelectronic device of claim 3, wherein the support member is constructed without micron-level tolerance alignment features to align the ferrule and the optical component.

13. The optoelectronic device of claim 3, wherein the substrate is disposed over a circuit board and the support member is bonded to the circuit board.

* * * * *